United States Patent
Amritphale et al.

(10) Patent No.: US 10,023,497 B2
(45) Date of Patent: Jul. 17, 2018

(54) MULTIFUNCTIONAL MATERIAL FOR WORKABILITY OF GEOPOLYMERIC SYSTEM AND ITS PROCESS THEREOF

(71) Applicant: COUNCIL OF SCIENTIFIC & INDUSTRIAL RESEARCH, New Delhi (IN)

(72) Inventors: Sudhir Sitaram Amritphale, Bhopal (IN); Ramesh Kumar Chouhan, Bhopal (IN); Manish Mudgal, Bhopal (IN); Sarika Verma, Bhopal (IN); Satyabrata Das, Bhopal (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 15/616,308

(22) Filed: Jun. 7, 2017

(65) Prior Publication Data
US 2017/0349488 A1 Dec. 7, 2017

(30) Foreign Application Priority Data
Jun. 7, 2016 (IN) .............................. 201611019506

(51) Int. Cl.
C04B 22/00 (2006.01)
C04B 22/06 (2006.01)
C04B 24/00 (2006.01)
C04B 28/00 (2006.01)
C04B 18/08 (2006.01)
C04B 18/12 (2006.01)
C04B 18/24 (2006.01)

(52) U.S. Cl.
CPC .......... C04B 22/0006 (2013.01); C04B 18/08 (2013.01); C04B 18/12 (2013.01); C04B 18/248 (2013.01); C04B 22/062 (2013.01); C04B 24/001 (2013.01); C04B 28/006 (2013.01)

(58) Field of Classification Search
CPC ..... C04B 22/006; C04B 22/062; C04B 24/01; C04B 18/08; C04B 18/12; C04B 18/248; C04B 28/006
See application file for complete search history.

(56) References Cited

U.S. PATENT DOCUMENTS

| | | | | |
|---|---|---|---|---|
| 4,328,035 A | * | 5/1982 | Ingles | ................... C04B 14/361 |
| | | | | 106/624 |
| 8,492,317 B2 | * | 7/2013 | Chatterji | ................. C04B 28/08 |
| | | | | 166/292 |
| 9,120,701 B2 | * | 9/2015 | Amritphale | ......... C04B 22/0006 |
| 2016/0318803 A1 | * | 11/2016 | Pianaro | ................. C04B 28/006 |
| 2017/0267870 A1 | * | 9/2017 | Amritphale | ............ C09D 5/084 |

FOREIGN PATENT DOCUMENTS

| | | | |
|---|---|---|---|
| CN | 104150478 A | * | 11/2014 |
| CN | 105523736 A | * | 4/2016 |
| CN | 105565725 A | * | 5/2016 |
| CN | 105819745 A | * | 8/2016 |
| CN | 106220006 A | * | 12/2016 |
| IN | 156/DEL/2014 | | 4/2016 |
| IN | 201502109 I3 | * | 12/2016 |
| WO | WO 2015/089611 A1 | * | 6/2015 |

OTHER PUBLICATIONS

"Efficacy of Available Super Plasticizers on Geopolymers" B. Nematollahi et al. Research Journal of Applied Sciences, Engineering and Technology 7(7);1278-1282,2014.
"Effect of Plasticizer and Super Plasticizer on Workability of Fly Ash Based Geopolymer Concrete". A.I. Laskar et. al. Proceedings of International Conference on Advanced in Architecture and Civil Engineering (AARCV 2012), 2012.

* cited by examiner

Primary Examiner — Anthony J Green
(74) Attorney, Agent, or Firm — Banner & Witcoff, Ltd.

(57) ABSTRACT

The present invention relates to a novel multifunctional material for workability of geopolymeric system and its process thereof. The viscous characteristics in geopolymeric system are responsible for observed negligible workability of geopolymeric cement concrete system and which limits its broad application spectrum. The novel multifunctional material of the present invention prepared by digestion of siliceous agricultural waste i.e. Rice husk with aqueous alkaline materials involving simultaneous and synergistic chemical reactions among the various constituents of rice husk, aqueous alkaline compounds and optionally adding Cetyl trimethyl ammonium bromide (CTAB) to obtain in-situ synthesis of desired nano-sized multi functional agents lignin, hemicelluloses, cellulose, sodium silicate necessary for addressing the issue of workability and also improving the engineering properties of geopolymeric system for broad application spectrum.

13 Claims, 1 Drawing Sheet

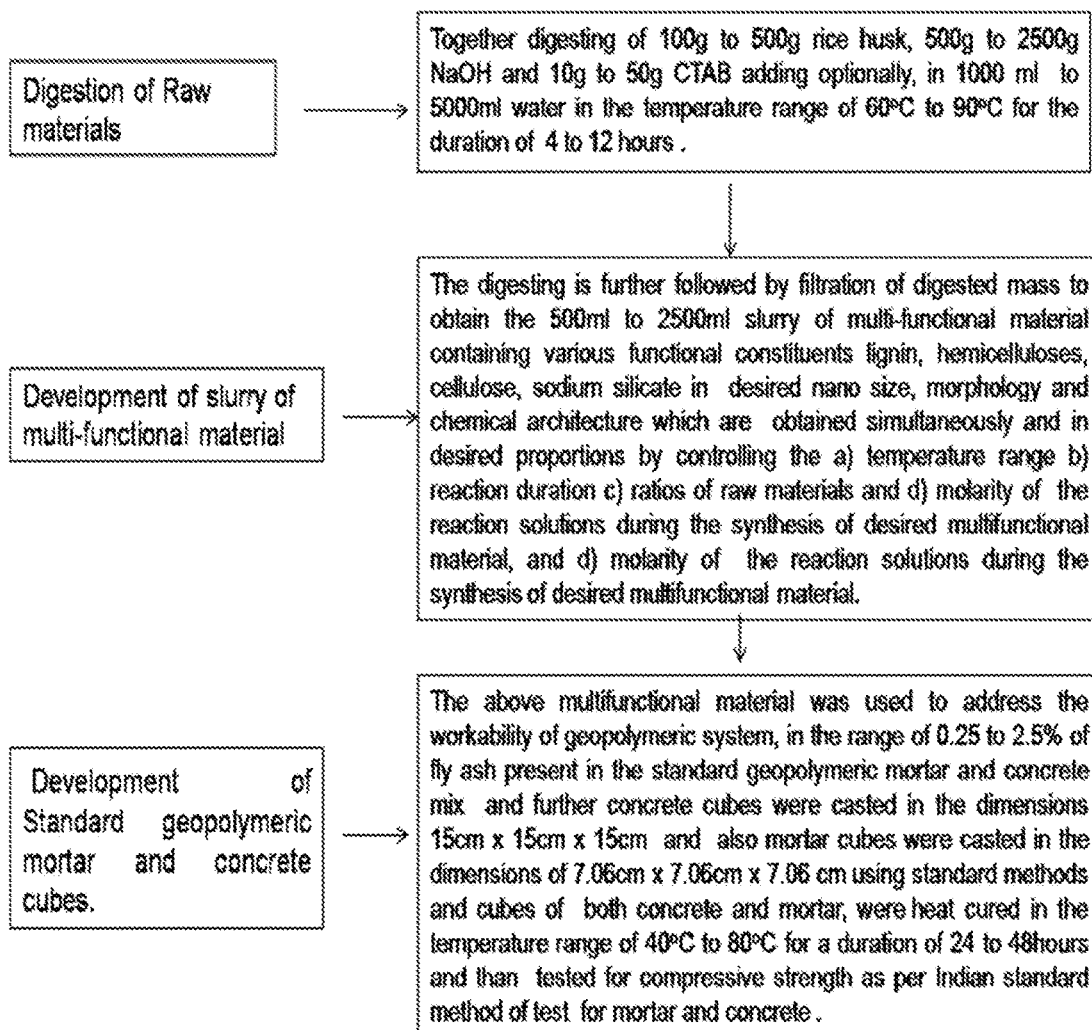

MULTIFUNCTIONAL MATERIAL FOR WORKABILITY OF GEOPOLYMERIC SYSTEM AND ITS PROCESS THEREOF

CROSS-REFERENCE TO RELATED APPLICATION

This application claims the benefit of Indian Patent Application 201611019506 filed Jun. 7, 2016, which application is incorporated by reference herein in its entirety.

The following specification particularly describes the invention and the manner in which it is to be performed:

FIELD OF THE INVENTION

The present invention relates to a novel multifunctional material for workability of geopolymeric system and its process thereof. More particularly, the invention describes new advanced multifunctional material capable of addressing viscosity issues of geopolymers along with further improving the techno economic aspect of the geo polymeric system and thus significantly widening its application spectrum. The multifunctional material has been developed by digesting siliceous agricultural waste i.e Rice husk with aqueous alkaline materials involving simultaneous and synergistic chemical reactions among the various constituents of rice husk, aqueous alkaline compounds and optionally adding cetyltrimethylammonium bromide (CTAB) to obtain in-situ synthesis of desired nano-sized multi functional agents lignin, hemicelluloses, cellulose, sodium silicate necessary for addressing the issue of workability and also improving the engineering properties of geopolymeric system.

BACKGROUND OF THE INVENTION AND DESCRIPTION OF PRIOR ART

The wide spread application of conventional geo polymer is presently hindering all over the world due to its workability aspect. Since a) the raw material, b) the process of making, and c) reaction mechanism involved in geopolymeric system are all together different than in convention cement making system and therefore the use of conventional super plasticizer and plasticizer does not hold good for the geopolymeric system because the super plasticizer are attacked by alkaline solutions and degrade rapidly. Researchers have found that the conventional super plasticizer do help to some extend but at the cost of compromising other functional properties of the geopolymeric system. Unlike, conventional cement concrete system, the geopolymeric system seriously suffers from the inherent viscous characteristics of the raw materials and the reaction product formed, i.e., geopolymeric gel necessary for making conventional geopolymeric system.

The conventional geopolymeric system is made using solution of a) sodium hydroxide b) sodium meta silicate which are viscous in nature. Further, the geopolymeric reaction of fly ash with alkaline activator solution prepared using NaOH and sodium meta silicate solution leads to the formation of geopolymeric gel which is also a highly viscous material. The viscous nature of geopolymeric gel is further gets enhanced due to the presence of un reacted solution of NaOH in the matrix of geopolymeric gel. Thus, overall the viscous characteristics in geopolymeric system are responsible for observed negligible workability of geopolymeric cement concrete system and which limits its broad application spectrum.

To improve the workability of geo polymeric system there is an urgent need to develop new advanced multifunctional material capable of addressing viscosity issues along with further improving the techno economic aspect of the geo polymeric system and thus significantly widening its application spectrum. In view of above a novel, process for making multifunctional material for geo polymeric system and the process thereof has been developed. The multifunctional material has been developed by a novel process comprising of digestion of siliceous agricultural waste, i.e., Rice husk with aqueous alkaline materials involving simultaneous and synergistic chemical reactions among the various constituents of rice husk, aqueous alkaline compounds and optionally added CTAB to obtain in-situ synthesis of desired nano-sized multi functional agents lignin, hemicelluloses, cellulose, sodium silicate necessary for addressing the issue of workability and also improving the engineering properties of geopolymeric system and ultimately leading to the techno-economic feasibility of geopolymeric system for broad application spectrum.

The use of developed multifunctional materials apart from addressing the issue of workability also enables:
1) obviating the need of one of the important and costly raw material that is sodium silicate otherwise necessarily required to be added externally.
2) Providing the hemicelluloses which is responsible for improving the mechanical properties, modifying the viscosity and also acts as a gelling agent.
3) Providing the cellulose which is also responsible for improving the mechanical properties, modifying the viscosity and also acts as a binding agent.
4) The alkaline rice lignin with a high hydroxyl group content possess excellent thermal stability and therefore it is useful for providing heat resistant properties to the developed geopolymeric matrix.

Reference may be made to article "Effect of Plasticizer and super plasticizer on workability of fly ash based geopolymer concrete" by A. I Laskar et. al. in Proceedings of International conference on Advanced in Architecture and Civil Engineering (AARCV 2012), 2012 wherein an attempt has been made to study variation of workability of fly ash based geopolymer concrete with the variation of lignin based plasticizer and poly carboxylic ether based super plasticizer. The drawback of the process that the use of plasticizers critically depends upon molarity of alkaline solutions used in geopolymeric system and since the conventional super plasticizers does not withstand high alkaline environment and also are not biodegradable.

Reference may be made to article "Efficacy of Available Super plasticizers on Geopolymers" by B. Nematollahi et al. in research journal of Applied Sciences, Engineering and Technology 7(7); 1278-1282,2014 wherein a state of the art review of the effect of different SPs on slag and fly ash based geopolymers has been reported. The drawback of the process is that the super plasticizers are attacked by alkaline solutions and degrade rapidly and also the conventional SPs are not biodegradable.

Although researchers have reported, that the use of super plasticizers used in conventional cement concrete system do not help in totality when they are used in Geopolymeric system. Further, no literature is available in making a novel multifunctional material useful for geopolymeric system for addressing its workability issues.

Reference may be made to Indian patent application 156/DEL/2014, wherein geopolymeric material is prepared in solid form using rice husk, NaOH, fly ash and optionally sodium silicate.

Further, from the reported prior it is found that development of multifunctional material useful for geopolymeric system for addressing its workability issues has not been pursued seriously. From the hitherto reported prior art and based on the drawbacks of the known processes, the various issues that need to be addressed and problems to be solved specially of workability concerns of conventional geopolymeric system need to be addressed urgently to widen the application spectrum of geopolymeric system.

SUMMARY OF THE INVENTION

One aspect of the present invention is to provide a novel multifunctional material for workability of geopolymeric system which obviates the drawbacks of the hitherto known prior art as detailed above.

Another aspect of the present invention is to develop a process for the preparation of novel multifunctional material for workability of geopolymeric system.

Still another aspect of the present invention is the use multifunctional material in the range of 0.25 to 2.5% of fly ash in preparing geopolymeric system design mix comprising of fly ash, sand, sodium hydroxide, sodium meta silicate and water.

Yet another aspect of the present invention is to provide a multifunctional material using siliceous agricultural waste, i.e., rice husk.

Still another aspect of the present invention is to develop a novel process enabling simultaneous and synergistic chemical reactions among the various constituents of rice husk and aqueous alkaline compounds and optionally adding CTAB to obtain in-situ synthesis of desired nano sized, multi functional agent's lignin, hemicelluloses and cellulose and sodium silicate.

Still yet another aspect of the present invention is to improve the engineering properties of geopolymeric system utilizing multifunctional material.

Yet another aspect of the present invention is to obviate the need of sodium silicate externally, which is one of the important raw materials for making geopolymeric system.

Still another aspect of the present invention is to solve the disposal problem of siliceous agricultural waste i.e. rice husk and to save the environment all over the world.

Another of the present invention is to obtain multifunctional material useful for imparting heat resistant properties apart from addressing the issues of workability.

Accordingly, aspects of the present invention provide a novel multifunctional material for addressing the issue of workability of geopolymeric system comprising: rice husk in the range of 6.2% to 8.5%, NaOH in the range of 1.7% to 31%, and optionally CTAB in the range of 0.62% to 0.85% and water in the range of 60 to 92%.

In an embodiment of the invention the novel multifunctional material possesses following properties:
i) pH=14
ii) viscosity in the range of 7 mPa·s to 11 mPa·s.

Accordingly, aspects of the invention also provide a process for preparation of novel multifunctional material comprising steps of:
a) digesting rice husk in the range of 6.2% to 8.5%, NaOH in the range of 1.7% to 31%, and optionally CTAB in the range of 0.62% to 0.85% in water in the range of 62% to 85% at a temperature in the range of 50° C. to 100° C. for a period in the range of 3 to 14 hours to obtain digested mass,
b) filtering the digested mass of step a) to obtain the slurry of multi-functional material in the range of 50% to 80% containing various functional constituents lignin, hemicelluloses, cellulose, sodium silicate in desired nano size in the range of 40 to 100 nm, morphology and chemical architecture.

In still another embodiment of the invention, the preferable temperature range is 60° C. to 90° C., and time period 4 to 12 hours.

The invention also provides the process for the preparation of geopolymeric mortar/concrete cubes using novel multifunctional material system comprising the steps of:
a) adding 0.25 to 1.5% slurry of multifunctional material with respect to fly ash in the standard geopolymeric mortar/ concrete mix and water and casting mortar/concrete cubes by known method,
b) curing the said mortar/concrete cubes at a temperature in the range of 40 to 60° C. for a period in the range of 46 to 50 hrs to obtain finished geopolymeric mortar/concrete cubes.

In an embodiment of the invention, the geopolymeric mortar cubes are obtained when slurry of multifunctional material is mixed with standard geopolymeric mortar comprising fly ash, sodium hydroxide, sodium meta silicate and water.

In another embodiment of the invention, the geopolymeric concrete cubes are obtained when slurry of multifunctional material is mixed with standard geopolymeric concrete comprising fly ash, sodium hydroxide, sodium meta silicate , coarse aggregate and fine aggregates and water.

In still another embodiment of the invention, the geopolymeric mortar/concrete cubes possess compressive strength in the range of 25 to 60 MPa.

In yet another embodiment of the invention, the mortar/concrete cubes being casted in the dimension of 7.06 cm×7.06 cm×7.06 cm and 15 cm×15 cm×15 cm.

In still yet another embodiment of the invention, the preferable curing time period is 48 hrs.

The novel process involves:
a) unique designing of chemical reactions among the raw materials namely rice husk, aqueous alkali and optionally added CTAB, to obtain the nano sized multi functional materials consisting of various nano sized functional agents Lignin, hemicelluloses, cellulose, sodium silicate which are obtained simultaneously and in desired proportions by controlling the a) temperature range b) reaction duration c) ratios of raw materials and d) molarity of the reaction solutions during the synthesis of desired multifunctional material.
b) Further the process additionally enables obtaining the multi functional material with desired 1) morphology 2) size 3) chemical architecting of various multifunctional agents to regulate the desired multifunctionality of the developed material suitable for appropriate application spectrum of the geopolymeric system.
c) Also the developed a novel process obviates the need of one of the important raw material that is sodium silicate as the chemical reaction among the raw material is designed in such a way that process mechanism enables in-situ synthesis of sodium silicate otherwise necessarily required to be added externally.
d) Further the develop process provides the hemicelluloses and cellulose in the form of sodium lignate responsible for improving the mechanical properties and modifying the viscosity and also acts as a gelling agent.

Some benefits provided by embodiments of the process disclosed herein include:

a) to introduce a new era of making novel multifunctional material for addressing the issue of workability of geopolymeric system.
b) to provide a multifunctional material using siliceous agricultural waste i.e rice husk.
c) to develop a novel process enabling simultaneous and synergistic chemical reactions among the various constituents of rice husk and alkaline compounds to obtain in-situ synthesis of desired multi functional agents Lignin, hemicelluloses, cellulose and nano size sodium silicate.
d) to improve the engineering properties of geopolymeric system utilizing multifunctional material.
e) to enable techno-economic feasibility of geopolymeric system for broad application spectrum.
f) to obviate the need of sodium silicate externally, which is one of the important raw materials for making geopolymeric system.
g) to obtain nano size sodium silicate in-situ itself in the geopolymeric matrix.
h) to solve the disposal problem of siliceous agricultural waste i.e. rice husk and to save the environment all over the world.
i) to obtain multifunctional material useful for imparting heat resistant properties apart from addressing the issues of workability.
j) to obtain multifunctional material useful for improving engineering properties.
k) to obviates the need of conventional synthetic super plasticizers.
l) to utilize biodegradable multifunctional material.

Advantages over existing processes that are provided by embodiments of the process disclosed herein include:
a) The novel process involves introduction of a new era of making novel multifunctional material for addressing the issue of workability of geopolymeric system.
b) The novel process involves providing a multifunctional material using siliceous agricultural waste i.e. rice husk.
c) The novel process involves enabling simultaneous and synergistic chemical reactions among the various constituents of rice husk and alkaline compounds to obtain in-situ synthesis of desired multi functional agents Lignin, hemicelluloses, cellulose and nano size sodium silicate.
d) The novel process involves unique designing of chemical reactions among the raw materials to obtain the nano size multi functional agents Lignin, hemicelluloses, cellulose, sodium silicate simultaneously and in desired proportions by controlling the a) temperature range b) reaction duration c) ratios of raw materials and d) molarity of the reaction solutions during the synthesis of desired multifunctional material.
e) The novel process enables obtaining the multi functional material with desired 1) morphology 2) size 3) chemical architecting of various multifunctional agents to regulate the desired multifunctionality of the developed material suitable for appropriate application spectrum of the geopolymeric system.
f) The novel process involves development of a novel process obviating the need of one of the important raw material that is sodium silicate as the chemical reaction among the raw material is designed in such a way that process mechanism enables in-situ synthesis of sodium silicate otherwise necessarily required to be added externally.
g) The novel process involves providing the hemicellulose in the form of sodium lignate responsible for improving the mechanical properties and modifying the viscosity and also acts as a gelling agent.
h) The novel process involves is to develop providing the cellulose in the fibrous form which is providing reinforcement and thus also responsible for improving the mechanical properties, modifying the viscosity and also acts as a binding agent.
i) The novel process involves developing the alkaline multifunctional agents imparting excellent thermal stability and therefore it is useful for providing heat resistant properties to the developed geopolymeric matrix.
j) The novel process involves improving the engineering properties of geopolymeric system utilizing multifunctional material.
k) The novel process involves enabling techno-economic feasibility of geopolymeric system for broad application spectrum.
l) The novel process involves obviate the need of sodium silicate externally, which is one of the important raw materials for making geopolymeric system.
m) The novel process involves obtaining nano size sodium silicate in-situ itself in the geopolymeric matrix.
n) The novel process involves solving the disposal problem of siliceous agricultural waste i.e. rice husk and to save the environment all over the world.
o) The novel process involves obtaining multifunctional material useful for imparting heat resistant properties apart from addressing the issues of workability.
p) The novel process involves obtaining multifunctional material useful for improving engineering properties apart from addressing the issues of workability.
q) The novel process involves obviates the need of conventional synthetic super plasticizers.
r) The novel process involves utilizing biodegradable multifunctional material.

In conclusion, the novel process of the present invention enables in introduction of a new era of making a novel multifunctional material for addressing the issue of workability of geopolymeric system and the process thereof". The use of developed multifunctional material lies in the addressing the issue of workability of conventional geopolymeric mortar and concrete systems leading to the broad application spectrum of the geopolymeric system.

Embodiments of the present invention provide a novel multifunctional material for addressing the issue of workability of geopolymeric system and the process thereof" which comprises digesting of 100 g to 500 g rice husk, 500 g to 2500 g NaOH and 10 g to 50 g CTAB was added optionally, in 1000 ml to 5000 ml water in the temperature range of 60° C. to 90° C. for the duration of 4 to 12 hours and followed by filtration of digested mass to obtain the 500 ml to 2500 ml slurry of multi-functional material containing various functional constituents lignin, hemicelluloses, cellulose, sodium silicate in desired nano size, morphology and chemical architecture which are obtained simultaneously and in desired proportions by controlling the a) temperature range b) reaction duration c) ratios of raw materials and d) molarity of the reaction solutions during the synthesis of desired multifunctional material, which was used to address the workability of geopolymeric system, in the range of 0.25 to 2.5% of fly ash present in the standard geopolymeric mortar and concrete mix and further concrete cubes were casted in the dimensions 15 cm×15 cm×15 cm and also mortar cubes were casted in the dimensions of 7.06 cm×7.06 cm×7.06 cm using standard methods and cubes of both concrete and mortar, were heat cured in the temperature range of 40° C. to 80° C. for a duration of 24 to 48 hours and then tested for compressive strength as per Indian standard method of test for mortar and concrete.

In an embodiment of the present invention a novel process which comprises digesting of 100 g to 500 g rice husk, 500 g to 2500 g NaOH and 10 g to 50 g CTAB was added optionally, in 1000 ml to 5000 ml water.

In another embodiment of the present invention a novel process which comprises digesting of raw materials in the temperature range of 60° C. to 90° C. for the duration of 4 to 12 hours.

In yet another embodiment of the present invention a novel process which comprises further filtration of digested mass to obtain the 500 ml to 2500 ml slurry of multifunctional material.

In still another embodiment of the present invention a novel process which comprises synthesis of multifunctional material containing various functional constituents lignin, hemicelluloses, cellulose, sodium silicate in desired nano size, morphology and chemical architecture.

In still another embodiment of the present invention a novel process which comprises obtaining various functional constituents simultaneously and in desired proportions by controlling the a) temperature range b) reaction duration c) ratios of raw materials and d) molarity of the reaction solutions during the synthesis of desired multifunctional material.

In still another embodiment of the present invention a novel process which comprises use of multifunctional material in the range of 0.25 to 2.5% of fly ash present in the standard geopolymeric mortar and concrete mix to address the workability of geopolymeric system.

In still another embodiment of the present invention a novel process which comprises testing of cured geopolymeric cubes and mortar for compressive strength as per Indian Standard method of test for mortar and concrete.

Embodiments of the present invention involve simultaneous and synergistic chemical reactions of rice husk with NaOH solution to enabling to obtain a novel multifunctional material for addressing the workability of geopolymeric system leading to extend the application spectrum of geopolymeric materials.

Embodiments of the present invention involve i) use of siliceous agricultural waste i.e., rice husk as a resource material for making novel multi functional material, ii) obtaining a multifunctional material by a novel process comprising unique combination of raw materials by chemically formulating and minerallogically designed synthesis of various process parameter, iii) utilization of various constituents of siliceous agricultural waste i.e., rice husk with aqueous solution alkaline materials and optionally added CTAB, iv) carry out digesting of materials in the lower temperature range of 60° C. to 90° C. itself, v) simultaneous and synergistic chemical reactions among the various constituents of rice husk and alkaline compounds to obtain in-situ synthesis of desired nano sized multi functional agents Lignin, hemicellulose, cellulose, sodium silicate, vi) unique designing of chemical reactions among the raw materials to obtain the nano size multi functional agents Lignin, hemicelluloses, cellulose, sodium silicate simultaneously and in desired proportions by controlling the a) temperature range b) reaction duration c) ratios of raw materials and d) molarity of the reaction solutions during the synthesis of desired multifunctional material.

BRIEF DESCRIPTION OF THE DRAWING

FIG. 1 is a process flow sheet depicting one embodiment of a method for making a multifunctional material according to aspects of the disclosure.

DETAILED DESCRIPTION

The invention provides a novel process obviating the need of one of the important raw material that is sodium silicate as the chemical reaction among the raw material is designed in such a way that process mechanism enables in-situ synthesis of sodium silicate otherwise necessarily required to be added externally.

The invention also describes in providing:
i) the hemicellulose in the form of sodium lignate responsible for improving the mechanical properties and modifying the viscosity and also acts as a gelling agent,
ii) the cellulose in the fibrous form which is providing reinforcement and thus also responsible for improving the mechanical properties, modifying the viscosity and also acts as a binding agent,
iii) the alkaline multifunctional agents imparting excellent thermal stability and therefore it is useful for providing heat resistant properties to the developed geopolymeric matrix.

An example of a process flow sheet for making a multifunctional material is shown in FIG. 1.

The following examples are given by way of illustration of the working of the invention in actual practice and therefore should not be construed to limit the scope of the present invention in any way.

EXAMPLE 1

Preparation of Novel Multifunctional Material

For the preparation of novel multifunctional material 100 g rice husk, 500 g NaOH, 10 g CTAB was digested in 1000 ml water at the temperature of 60° C. for the duration of 4 hours and the digested mass was filtered using 45 micron sieves to obtain the 500 ml slurry of multi-functional material. The pH and viscosity of the material was found to be 14 and 7.3 mPa·s

EXAMPLE 2

Preparation of Novel Multifunctional Material

For the preparation of novel multifunctional material 500 g rice husk, 2500 g NaOH, 50 g CTAB was digested in 5000 ml water at the temperature of 90° C. for the duration of 12 hours and the digested mass was filtered using 45 micron sieves to obtain the 2500 ml slurry of multi-functional material. The pH and viscosity of the material was found to be 14 and 9.5 mPa·s

EXAMPLE 3

Workability/Utilization of Novel Multifunctional Material

For addressing the workability of standard geopolymeric system 0.25% slurry of multifunctional materials with respect to fly ash present in the standard geopolymeric mortar was added to the design mix comprising of 250 g fly ash, 500 g sand, 33 g of sodium hydroxide,16.5 g of sodium meta silicate and 66 ml of water and the mortar cubes were casted in the dimensions of 7.06 cm×7.06 cm×7.06 cm using standard methods and were heat cured in the temperature range of 40° C. for a duration of 48 hours and mortar were tested for 1) change in workability by flow table test with respect to controlled mix possessing slump value 100 mm and found to be 107 mm for when slurry of 0.25% were added 2) cubes were tested for compressive strength as per Indian Standard method of test for 3,7 and 14 days and found to possess compressive strength of 35.8 MPa, 37.7 MPa and 39.2 MPa respectively for geopolymeric mortar cubes.

EXAMPLE 4

Workability/Utilization of Novel Multifunctional Material

For addressing the workability of standard geopolymeric system 0.50% (10% CTAB) containing slurry of multifunctional materials with respect to fly ash present in the standard geopolymeric mortar was added to the design mix comprising of 250 g fly ash, 500 g sand, 33 g of sodium hydroxide, 16.5 g of sodium meta silicate and 66 ml of water and the mortar cubes were casted in the dimensions of 7.06 cm×7.06 cm×7.06 cm using standard methods and were heat cured in the temperature range of 40° C. for a duration of 48 hours and mortar were tested for 1) change in workability by flow table test with respect to controlled mix possessing slump value 100 mm and found to be 113 mm for when slurry of 0.50% were added 2) cubes were tested for compressive strength as per Indian Standard method of test for 3, 7 and 14 days and found to possess compressive strength of 38.7 MPa, 39.5 MPa and 40.3 MPa respectively for geopolymeric mortar cubes.

EXAMPLE 5

Workability/Utilization of Novel Multifunctional Material

For addressing the workability of standard geopolymeric system 1% slurry of multifunctional materials with respect to fly ash present in the standard geopolymeric mortar was added to the design mix comprising of 250 g fly ash, 500 g sand, 33 g of sodium hydroxide, 16.5 g of sodium meta silicate and 66 ml of water and the mortar cubes were casted in the dimensions of 7.06 cm×7.06 cm×7.06 cm using standard methods and were heat cured in the temperature range of 40° C. for a duration of 48 hours and mortar were tested for 1) change in workability by flow table test with respect to controlled mix possessing slump value 100 mm and found to be 133 mm for when slurry of 1% were added 2) cubes were tested for compressive strength as per Indian Standard method of test for 3, 7 and 14 days and found to possess compressive strength of 39.1 MPa, 41.5 MPa and 50.6 MPa respectively for geopolymeric mortar cubes.

EXAMPLE 6

Workability/Utilization of Novel Multifunctional Material

For addressing the workability of standard geopolymeric system 1.5% slurry of multifunctional materials with respect to fly ash present in the standard geopolymeric mortar was added to the design mix comprising of 250 g fly ash, 500 g sand, 33 g of sodium hydroxide, 16.5 g of sodium meta silicate and 66 ml of water and the mortar cubes were casted in the dimensions of 7.06 cm×7.06 cm×7.06 cm using standard methods and were heat cured in the temperature range of 40° C. for a duration of 48 hours and mortar were tested for 1) change in workability by flow table test with respect to controlled mix possessing slump value 100 mm and found to be 140 mm for when slurry of 1.5% were added 2) cubes were tested for compressive strength as per Indian Standard method of test for 3, 7 and 14 days and found to possess compressive strength of 41.5 MPa, 44.7 MPa and 47.2 MPa respectively for geopolymeric mortar cubes.

EXAMPLE 7

Workability/Utilization of Novel Multifunctional Material

For addressing the workability of standard geopolymeric system 0.50% slurry of multifunctional materials with respect to fly ash present in the standard geopolymeric concrete was added to the design mix comprising of 1.5 kg fly ash, 0.213 kg sodium hydroxide, 0.106 kg sodium meta silicate, 5 kg coarse aggregate, 2.5 kg fine aggregates and 0.462 l of water and the mortar cubes were casted in the dimensions of 15 cm×15 cm×15 cm using standard methods and were heat cured in the temperature range of 60° C. for a duration of 48 hours and were tested for 1) change in workability by measuring the slump with respect to controlled mix possessing slump value 150 mm and found to be 170 mm for when slurry of 0.50% were added 2) were tested for compressive strength as per Indian Standard method of test for 3, 7, 14 days and 28 days and found to possess compressive strength of 46.1 MPa, 48.2 MPa, 51.4 MPa and 58.1 MPa respectively for geopolymeric concrete cubes.

EXAMPLE 8

Workability/Utilization of Novel Multifunctional Material

For addressing the workability of standard geopolymeric system 0.25% slurry of multifunctional materials with respect to fly ash present in the standard geopolymeric concrete was added to the design mix comprising of 1.5 kg fly ash, 0.213 kg sodium hydroxide, 0.106 kg sodium meta silicate, 5 kg coarse aggregate, 2.5 kg fine aggregates and 0.462 l of water and the mortar cubes were casted in the dimensions of 15 cm×15 cm×15 cm using standard methods and were heat cured in the temperature range of 60° C. for a duration of 48 hours and were tested for 1) change in workability by measuring the slump with respect to controlled mix possessing slump value 150 mm and found to be 160 mm for when slurry of 0.25% were added 2) were tested for compressive strength as as per Indian Standard method of test for 3, 7, 14 days and 28 days and found to possess compressive strength of 25.9 MPa, 26.1 MPa, 26.0 MPa and 30.9 MPa respectively for geopolymeric concrete cubes.

Advantages of the present invention include:
i) unique designing of chemical reactions among the raw materials to obtain the nano size multi functional agents Lignin, hemicelluloses, cellulose, sodium silicate simultaneously and in desired proportions by controlling the a) temperature range b) reaction duration c) ratios of raw materials and d) molarity of the reaction solutions during the synthesis of desired multifunctional material.
ii) total utilization of rice husk waste.
iii) A low temperature and energy efficient process for making novel multifunctional material for addressing the issue of workability of geopolymeric system.
iv) to develop a novel process obviating the need of one of the important raw material that is sodium silicate as the chemical reaction among the raw material is designed in such a way that process mechanism enables in-situ synthesis of sodium silicate otherwise necessarily required to be added externally.
v) providing the hemicellulose in the form of sodium lignate responsible for improving the mechanical properties and modifying the viscosity and also acts as a gelling agent.
vi) providing the cellulose in the fibrous form which is providing reinforcement and thus also responsible for improving the mechanical properties, modifying the viscosity and also acts as a binding agent.
vii) to develop the alkaline multifunctional agents imparting excellent thermal stability and therefore it is useful for providing heat resistant properties to the developed geopolymeric matrix.

We claim:

1. A material for addressing an issue of workability of a geopolymeric system comprising: rice husk in a range of 6.2% to 8.5%, NaOH in a range of 1.7% to 31%, and water in the range of 60 to 92%.

2. The material as claimed in claim 1, wherein the material possesses properties comprising:
 i) pH=14
 ii) viscosity in a range of 7 mPa·s to 11 mPa·s.

3. The material as claimed in claim 1, further comprising cetyltrimethylammonium bromide (CTAB) in a range of 0.62% to 0.85%.

4. A process for preparation of a material for addressing an issue of workability of a geopolymeric system comprising steps of:
 a) digesting rice husk in a range of 6.2% to 8.5% and NaOH in a range of 1.7% to 31% in water in a range of 62% to 85% at a temperature in a range of 50° C. to 100° C. for a time period in a range of 3 to 14 hours to obtain a digested mass,
 b) filtering the digested mass of step a) to obtain a slurry of the material in a range of 50% to 80% containing lignin, hemicelluloses, cellulose, and sodium silicate, wherein the sodium silicate has a size in a range of 40 to 100 nm.

5. The process as claimed in claim 4, wherein the range of the temperature is 60° C. to 90° C., and the time period range is 4 to 12 hours.

6. The process as claimed in claim 4, wherein step a) further comprises digesting cetyltrimethylammonium bromide (CTAB) in a range of 0.62% to 0.85% in the water.

7. A process for preparation of geopolymeric mortar/concrete cubes, the process comprising the steps of:
 a) adding a slurry of a material comprising rice husk in a range of 6.2% to 8.5%, NaOH in a range of 1.7% to 31%, and water in the range of 60 to 92% to a geopolymeric mortar/ concrete mix and water, the geopolymeric mortar/concrete mix including fly ash, and the slurry having a concentration of 0.25% to 1.5% with respect to the fly ash in the geopolymeric mortar/concrete mix, and casting mortar/concrete cubes from the geopolymeric mortar/concrete mix, b) curing the mortar/concrete cubes at a temperature in a range of 40 to 60° C. for a time period in a range of 46 to 50 hrs to obtain finished geopolymeric cubes.

8. The process as claimed in claim 7, wherein the geopolymeric mortar/concrete mix comprises sodium hydroxide, sodium meta silicate and water, and the finished geopolymeric cubes are geopolymeric mortar cubes.

9. The process as claimed in claim 7, wherein the geopolymeric mortar/concrete mix comprises sodium hydroxide, sodium meta silicate, coarse aggregate and fine aggregates and water, and the finished geopolymeric cubes are geopolymeric concrete cubes.

10. A The process as claimed in claim 7, wherein the finished geopolymeric cubes possess compressive strength in a range of 25 to 60 MPa.

11. The process as claimed in claim 7, wherein mortar/concrete cubes are casted in dimensions of 7.06 cm×7.06 cm×7.06 cm and 15 cm×15 cm ×15 cm.

12. A The process as claimed in claim 7, wherein the time period of the curing is 48 hrs.

13. The process as claimed in claim 9, wherein the material further comprises cetyltrimethylammonium bromide (CTAB) in a range of 0.62% to 0.85%.

* * * * *